United States Patent [19]

Scott

[11] 4,293,864

[45] Oct. 6, 1981

[54] LASER SCANNER TRANSPORT

[75] Inventor: Richard D. Scott, Cherry Hill, N.J.

[73] Assignee: The United States of America as represented by the Secretary of the Army, Washington, D.C.

[21] Appl. No.: 114,916

[22] Filed: Jan. 24, 1980

[51] Int. Cl.³ .............................................. G01D 15/14
[52] U.S. Cl. ................................. 346/76 L; 346/108; 350/6.9; 358/290
[58] Field of Search ............................ 346/76 L, 108; 350/6.91, 6.9; 358/290, 289

[56] References Cited

U.S. PATENT DOCUMENTS

| 1,746,407 | 2/1930 | Schroter | 358/290 |
| 2,816,659 | 6/1974 | Landsman | 358/290 |
| 3,958,250 | 5/1976 | Rolon | 346/108 X |

*Primary Examiner*—Joseph W. Hartary
*Attorney, Agent, or Firm*—Jeremiah G. Murray

[57] ABSTRACT

An electromechanical means, forming part of a high speed printer, to cause a 45° mirror to simultaneously rotate on its axis and translate back and forth inside a transparent cylinder, thereby causing a modulated laser beam directed onto said mirror along the axis of said cylinder to describe a helical scanning pattern on said cylinder and the printing medium thereon.

12 Claims, 7 Drawing Figures

LASER SCANNER TRANSPORT

BACKGROUND OF THE INVENTION

The field of this invention is high speed printing, and more particularly it involves a laser scanner transport which forms a part of a high speed tactical line printer. The printer comprises a transparent cylinder on the outside of which is wound an ink or dye impregnated carrier which is analogous to a typewriter ribbon, with the paper wound on top of the carrier. A modulated laser beam is directed from an external source along the axis of said transparent cylinder and is reflected from a moving mirror disposed at an angle of 45 degrees to the axis of said cylinder. The mirror rotates about its axis and simultaneously translates back and forth along the axis of said transparent cylinder to accomplish scanning of the carrier and paper by the laser beam. The beam is brought to a focus on the carrier by means of a lens. The laser beam thus makes a helical path on the surface of the carrier. When the laser beam strikes the carrier, it locally vaporizes a small amount of ink or dye thereon, which then recondenses on the cold paper to form the characters. The modulation of the laser beam is computer-controlled. Such a printer requires an electromechanical means to transport the scanning mirror back and forth within the transparent cylinder. This laser scanner transport is the subject of the present invention. The novel mechanism is designed to occupy a minimum of space, has minimum weight for its stiffness, includes a pair of self-contained drive motors, and is designed for a tracking accuracy of + or −0.002 inches, which is required in a printer of this type.

SUMMARY OF THE INVENTION

The laser scanner transport of this invention comprises a housing which can be in the form of a hollow cylinder with the 45 degree mirror projecting axially from one end thereof. The mirror is rotated by a spinner motor connected thereto. The housing is adapted to translate back and forth along its axis. The printer mechanism is arranged with the axis of the transparent cylinder and the cylinder of the scanner transport collinear, and with the aforementioned mirror arranged so that as the scanner transport translates back and forth, the scanning mirror travels from one end of the transparent cylinder to the other along the axis thereof, to accomplish the scanning function. The translation is accomplished by means of a translating motor carried by the housing. The housing is constrained and moves on small wheels which engage a pair of rails mounted on opposite sides thereof. The wheels are mounted on the inside of a stationary frame which surrounds the moveable housing. Several alternative means of accomplishing this translating motion will be described. One embodiment involves the use of pulleys mounted on said housing and driven by the translating motor. The pulleys engage cables attached to the stationary frame to accomplish the desired translation with a minimum of backlash and positive traction. Other means of driving the moveable housing include friction wheels engaging the stationary frame, racks and pinions, and a pair of spur gears locked in engagement with each other, with one gear travelling along a stationary lead screw.

Further details of the structure and mode of operation of this novel apparatus will become apparent from the drawings and the detailed description of preferred embodiments.

DETAILED DESCRIPTION OF A PREFERRED EMBODIMENT

Figure 1:
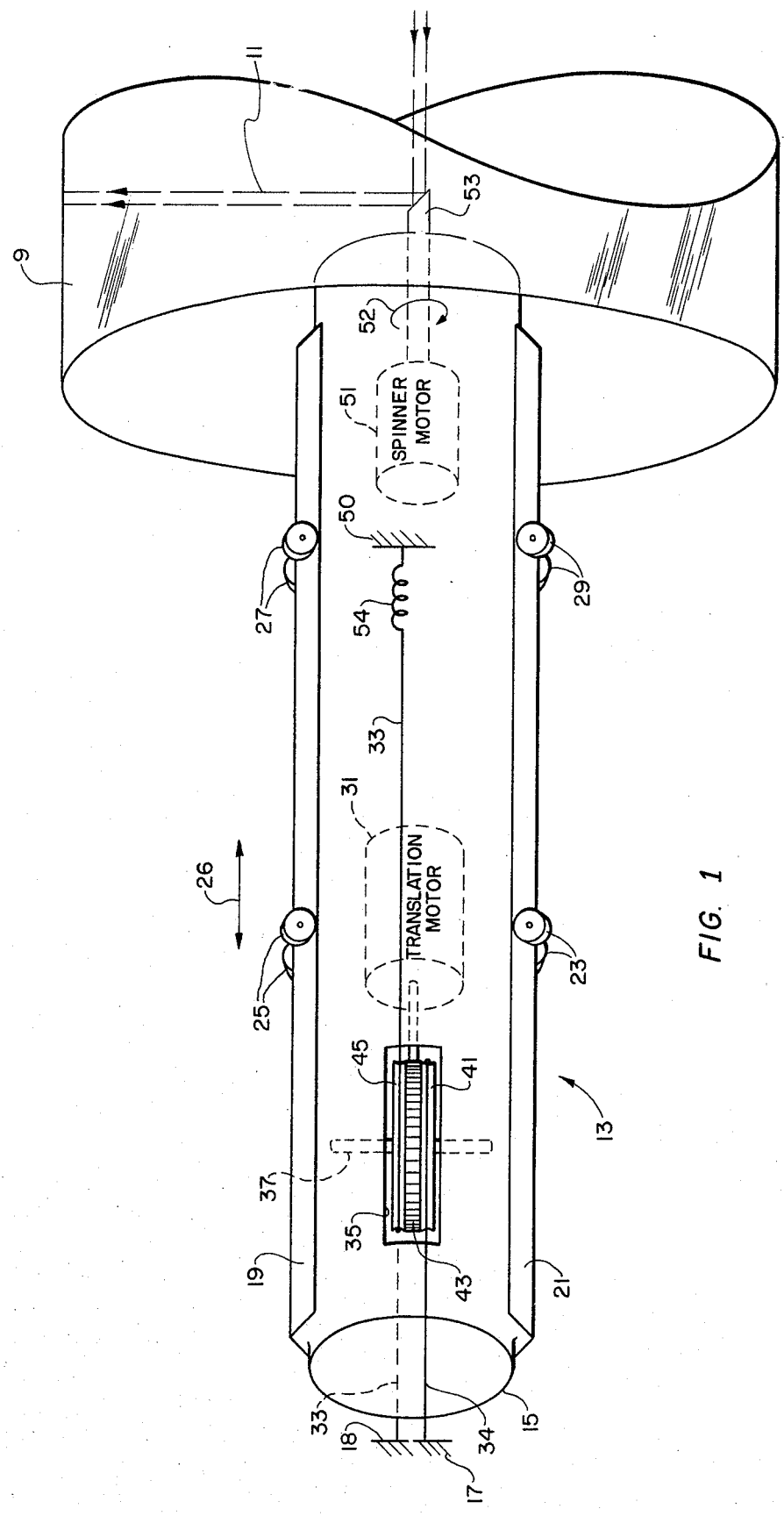
FIG. 1 is a view of the laser scanner transport showing its relationship to the transparent cylinder on which the printing operation takes place.

In FIG. 1, 9 is the transparent hollow cylinder on the outside of which the printing paper and the carrier, not shown, are wound. The cylinder is designed to accommodate a single page of printing paper and a single page of carrier on its outside surface. A paper and carrier feed mechanism, which forms no part of this invention and hence is not illustrated, automatically wraps new sheets of printing paper and carrier on the cylinder just prior to each page printing operation and removes them subsequent to printing. During the printing operation, the laser scanner transport 13 moves 45 degree scanning mirror 53 along the axis of cylinder 9 from one end thereof to the other. The laser beam 11 which has modulated thereon the intelligence to be printed, is directed by apparatus not shown along the axis of cylinder 9 from the right hand side thereof, as seen in FIG. 1, or the side opposite that on which the laser scanner transport 13 is located. The spinner motor 51 continually rotates the 45 degree mirror 53 around its axis in one direction as indicated by arrow 52 and the translation motor 31 reciprocates the mechanism back and forth in the directions of the double-headed arrow 26. The combination of the reciprocation and rotation of the mirror 53 results in a helical scanning path of the laser beam on the surface of the cylinder 9, and on the carrier and paper thereon.

The laser scanner transport 13 comprises a moveable housing 15 which is shown on the form of a hollow cylinder, however other shapes for this element are possible. The housing 15 includes a pair of rails 19 and 21 disposed parallel to each other along the periphery of the cylinder 15 at diametrically opposite points. The rails engage sets of wheels 23, 25, 27, and 29 which are fixedly mounted on a stationary frame, not shown in FIG. 1. The combination of the rails and wheels allows the moveable housing 15 to move back and forth in the desired direction. The wheels 23, 25, 27, and 29 will have appropriate bearings both to accurately constrain the housing and the mirror 53 to the desired path along the axis of cylinder 9 and also to facilitate the movement of the housing. These wheels may simply comprise ball bearings with the outer races thereof engaging the rails. Also, the positions of the rails and wheels or bearings may be interchanged, that is, the rails could be mounted on the stationary housing and the wheels on the moveable housing.

The translation motor 31 is mounted within and supported by moveable housing 15, as is spinner motor 51. The motor 31 actuates a mechanical system which is connected to the aforementioned stationary frame to accomplish the desired reciprocation. The embodiment of FIGS. 1, 2, 3, and 4 shows a transport scanner drive system in which the translation motor 31 drives a pair of spur gears each of which includes a pair of pulleys integrally mounted therewith. The pulleys engage a pair of cables which are anchored at each end to the stationary frame which surrounds the moveable housing.

Figure 2:
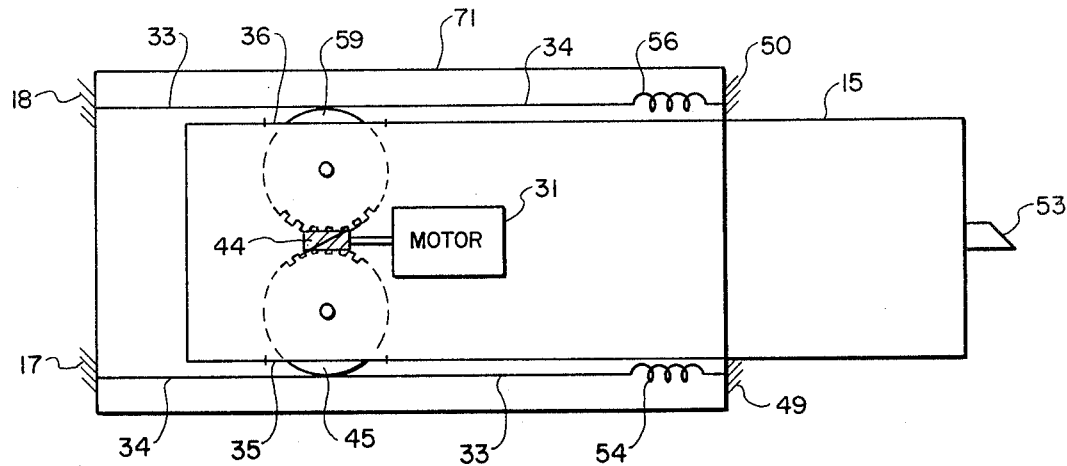
FIGS. 2, 3, and 4 are respectively schematic top, side, and end views of the laser scanner transport of FIG. 1, showing how the pulleys, cables and motor are arranged to reciprocate it in the desired fashion.
Figure 4:
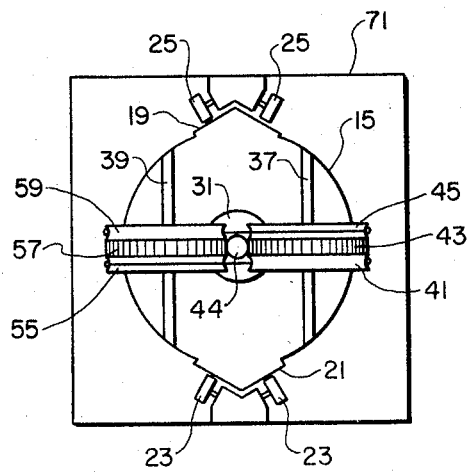

As seen in FIGS. 2 and 4, the motor 31 has a worm gear 44 at the end of its drive shaft 47. The worm engages a pair of spur gears 43 and 57 which are disposed on opposite sides of the worm. The spur gear 43 rotates on shaft 37 and spur gear 57 rotates on shaft 39, both of these shafts being fixedly mounted on the inside of housing 15, as shown. Integrally attached to spur gear 43 and rotating therewith are a pair of pulleys 41 and 45, shown on opposite sides thereof. Similarly, spur gear 57 has pulleys 55 and 59 integral therewith. Both sets of pulleys project through windows 35 and 36 in the housing 15, so that each can engage a pair of cables arranged between moveable housing 15 and stationary frame 71. The window 35 for pulleys 41 and 45 can be seen in FIG. 1. It can be seen in FIG. 4 that this arrangement provides two pulleys in one plane and another pair of pulleys on another plane. One of these pairs of pulleys engages a cable which is anchored at one end to one end of stationary frame 71 and is threaded on the two co-planar pulleys in an S-shaped configuration, and is then anchored via a spring to frame 71 at its opposite end and also on the opposite side of the moveable housing 15 relative to its other anchor point. Similarly the other pair of co-planar pulleys engage another cable which extends from one end of frame 71 and from one side of the housing 15, around the two pulleys in a reverse S-shape, and thence via a spring to another anchor point at the opposite end of the frame 71 and also on the opposite side of housing 15.

Figure 3:
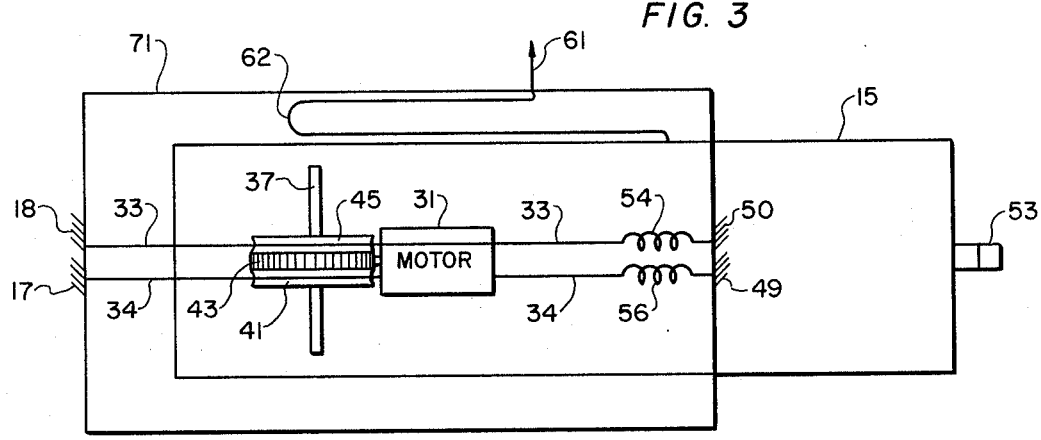

In FIGS. 2 and 3 the cable 33 is shown anchored at 18 to one end of the frame 71. This cable passes around pulley 59 which projects through window 36 in moveable housing 15, and thence crosses over the worm 44 to pass over the left side of pulley 45, as seen in FIG. 2, and thence out of window 35 through which pulley 45 projects, then along the opposite side of housing 15 to anchor point 49 via spring 54. Similarly, cable 34 begins at anchor 17, engages the two lower pulleys 41 and 55 and then extends along the opposite side of housing 15 to anchor point 50 via spring 56. It can be seen that the cable 34, as viewed on FIG. 2, as it passes over pulleys 41 and 55 will have an S-shaped configuration, while that of cable 33 as it passes over pulleys 45 and 59 will have a reverse S-shaped configuration, which is the mirror image of an S. The springs 54 and 56 keep the cables in tension so that backlash between the pulleys and cables is minimized, as the moveable housing reverses direction. To accomplish this, the springs are made stiff enough so that the tension in the cables is larger than the forces required to accelerate the moveable housing.

The stationary frame 71 is illustrated as a hollow metallic box of square cross-section, however other shapes are possible for this element. The stationary frame 71 must be positioned with the center of its cross-section collinear with the axes of the cylinder 9 and the moveable housing 15 and positioned alongside cylinder 9 so that the moveable housing which moves within it can perform the required scanning function. FIG. 4 shows how the wheels 23 and 25 may be attached to the upper and lower inside walls of frame 71 to engage rails 19 and 21 attached to the upper and lower periphery of moveable housing 15. FIG. 3 shows electrical cable 61 which extends through the wall of stationary frame 71 and is folded along the space between frame 71 and housing 15, as shown. This cable is formed in a ribbon-like shape so that it can easily bend at the point 62 to accommodate the motion of housing 15. An appropriate control circuit would be provided to reverse the direction of rotation of translation motor 31 at the extremities of its travel. Such a circuit could include limit switches which would reverse the polarity of the DC voltage applied to motor 31 at each limit of its travel.

Figure 5:
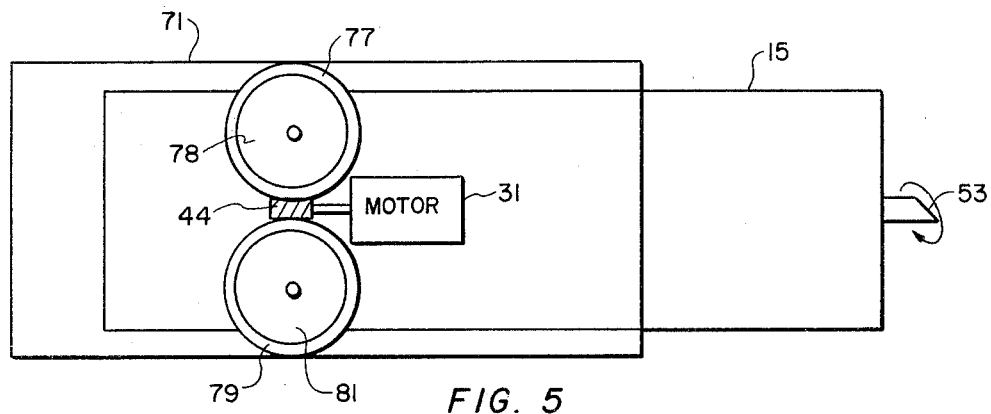
FIG. 5 shows a modified drive system utilizing friction wheels in place of the pulleys.
Figure 6:
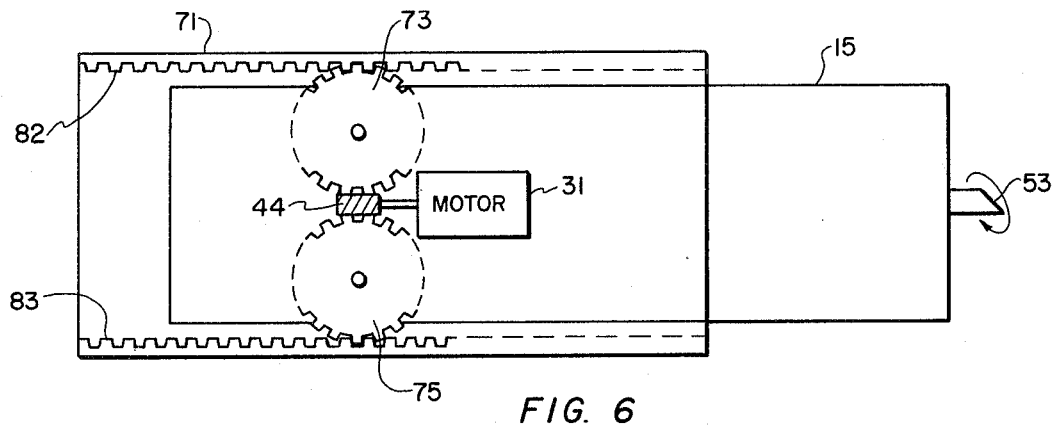
FIG. 6 shows another modified drive system utilizing racks and pinions.
Figure 7:
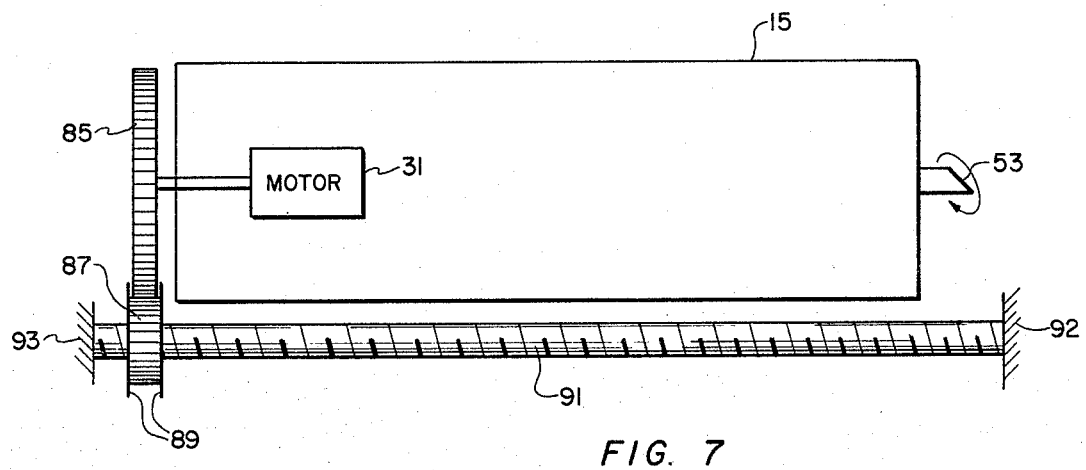
FIG. 7 shows a further modification of the drive system involving a pair of spur gears and a stationary lead screw.

FIGS. 5, 6, and 7 show alternate embodiments of the drive system for the moveable housing 15. In FIG. 5, the translation motor 31 drives a worm 44 which engages a pair of spur gears, not shown, which are similar to the gears 43 and 57 of the previously described embodiment. Instead of having pulleys integral therewith, the spur gears in FIG. 5 each have rubber-tired wheels attached thereto. The wheels are indicated at 78 and 81 in FIG. 5 and the rubber rims or tires at 77 and 79. These wheels engage the inside surface of stationary frame 71 to provide traction for the moveable housing 15.

In the alternate embodiment of FIG. 6, the worm 44 drives a pair of spur gears which are also similar to the spur gears 43 and 57 of the embodiment of FIGS. 1–4. The gear 73 engages a rack 82 which is fixedly attached to the inside wall of stationary frame 71 and similarly the gear 75 engages a rack 83 which is attached to frame 71 but on the opposite thereof from the first rack. It can be seen that operation of the motor 31 will propel the moveable housing along the inside of the stationary frame.

In the embodiment of FIG. 7, the translation motor 31 drives a spur gear 85 which rotates in a plane perpendicular to the axis of cylinder 15 and outside thereof at the end opposite to that of rotating mirror 53. The gear 15 engages a smaller pinion 87 which is threaded onto a stationary lead screw 91. The lead screw 91 is anchored at points 92 and 93 which could be part of the stationary frame 71 of the previous embodiments. The pinion 87 includes flanges or skirts 89 on both sides thereof, to hold the gears 85 and 87 in engagement as the motor 31 is operated. As the motor is operated, the flanges on pinion 87 will pull the gear 85 and the moveable housing 15 along with it as the pinion rotates on the stationary lead screw.

The laser scanner transport described is capable of moving the 45 degree mirror along the desired path quickly and accurately at laser scanning speeds of up to 5500 inches per second. Printing can be accomplished with a laser output power of only 5 watts. The length of the transparent cylinder 9 is 8 inches. This is also the stroke of the scanner transport. Printing occurs during both directions of travel of the moveable housing.

While the invention has been described in connection with preferred embodiments, obvious modifications thereof will occur to those skilled in the art, therefore the invention should be limited only by the scope of the appended claims.

I claim:

1. A high speed printer comprising, a transparent cylinder adapted to have wound on the periphery thereof a carrier containing an ink or dye with printing paper wound on top of said carrier, means to direct a modulated laser beam containing intelligence to be printed along the axis of said transparent cylinder from one side thereof, a laser scanner transport mechanism adjacent to and on the other side of said transparent cylinder, said laser scanner transport comprising, a hollow stationary frame with the center of its cross-section disposed along the axis of said transparent cylinder, a moveable housing adapted to reciprocate back and forth within said stationary frame, a rotating 45 degree mirror mounted at the end of said moveable housing nearest to said transparent cylinder, and on the axis thereof, means to rotate said 45 degree mirror around its axis, a translation motor mounted within said moveable housing, said translation motor driving a mechanical system for providing traction between said moveable housing and said stationary frame, whereby said moveable housing will reciprocate so that said 45 degree mirror will periodically traverse the inside of said transparent cylinder from one end thereof to the other, along the axis thereof, to provide helical scanning patterns on said transparent cylinder and the paper and carrier mounted thereon.

2. The apparatus of claim 1 wherein said moveable housing comprises a hollow cylinder with two rails along the periphery thereof parallel to the axis of said hollow cylinder and at diametrically opposed points on said periphery, said rails engaging wheels mounted on the inside of said stationary housing.

3. The apparatus of claim 2 wherein said stationary frame comprises a hollow box of square cross-section and open ends.

4. The apparatus of claim 1 wherein said mechanical system to provide traction between said moveable housing and said stationary frame comprises a worm gear driven by said translation motor, said motor having its drive shaft disposed collinear with the axis of said transparent cylinder, a pair of spur gears on opposite sides of said worm gear and both driven by said worm gear, each of said spur gear having a pair of integral pulleys thereon, each of said pulleys projecting through windows on opposite sides of said moveable housing into the space between said housing and said stationary frame, each co-planar pair of said pulleys engaging a stationary cable which is anchored to opposite ends of said stationary frame, one of said cables being anchored at a first end of said stationary frame and on a first side of said moveable housing, passing around a first pair of said co-planar pulleys in an S-shaped configuration and thence along the second side of said moveable housing to an anchor point at the end opposite from said first end of said stationary frame, the other of said cables being anchored at said first end of said stationary frame on the side of said moveable housing opposite from said first side thereof, said other of said cables then passing over two other co-planar pulleys in a reverse S-shaped configuration and thence along said first side of said moveable housing to an anchor point at the end opposite from said first end of said stationary housing, and wherein each of said cables is connected to one of its anchor points via a spring.

5. The apparatus of claim 1 wherein said mechanical system for providing traction comprises, a worm gear drive by said translation motor, said motor having its drive shaft disposed collinearly with the axis of said transparent cylinder, a pair of spur gears mounted for rotation of shafts on the inside of said moveable housing and on opposite sides of said worm gear, both of said spur gears being driven by said worm gear, each of said spur gears having a rubber-rimmed wheel of greater diameter than said spur gear integrally attached thereto, each of said wheels projecting through windows on opposite sides of said moveable housing and engaging the inside surface of said stationary housing.

6. The apparatus of claim 1 wherein said mechanical system for providing traction comprises a worm gear driven by said translation motor, said motor having its drive shaft disposed collinearly with the axis of said transparent cylinder, a pair of spur gears mounted for rotation on shafts on the inside of said moveable housing and on opposite sides of said worm gear, both of said spur gears being driven by said worm gear, each of said spur gears projecting through windows on opposite sides of said moveable housing, a pair of racks attached to the inside surface of said stationary frame on opposite sides thereof, said racks being arranged to mesh with a different one of said spur gears.

7. The apparatus of claim 1 wherein said mechanical system for providing traction comprises a spur gear attached to the drive shaft of said translation motor, said motor having its drive shaft collinearly disposed with the axis of said transparent cylinder, said spur gear being located outside of said moveable housing on the end thereof opposite from said rotating mirror, said spur gear meshing with a pinion gear which in turn is threaded onto a stationary lead screw anchored to the inside of said stationary frame, and means connected to said spur and pinion gears to keep them in mesh, thereby providing the desired traction for said moveable housing.

8. A laser scanner transport comprising; a hollow stationary frame with open ends, a moveable housing adapted to move back and forth within said stationary frame by means of a system of rails and wheels connecting said moveable housing and said stationary frame, a 45 degree scanning mirror mounted at one end of said moveable housing, said mirror being rotated around its axis by a spinner motor connected thereto, said moveable housing further comprising a translation motor mounted therein and arranged to power a mechanical system for moving said moveable housing back and forth.

9. The apparatus of claim 8 wherein said mechanical system for moving said moveable housing back and forth comprises; a worm gear driven by said translation motor, said motor having its drive shaft disposed parallel to the direction of the back and forth movement of said moveable housing, a pair of spur gears on opposite sides of said worm gear and both driven by said worm gear, each said spur gear having a pair of integral pulleys thereon, each of said pulleys projecting through windows on opposite sides of said moveable housing into the space between it and the stationary frame, each co-planar pair of said pulleys engaging a stationary cable which is anchored to opposite ends of said stationary frame and on opposite sides of said moveable housing, whereby one of said cables passes over said pair of co-planar pulleys in an S-shaped configuration and the other cable passes over the other pair of co-planar pulleys in a reverse S-shaped configuration, and wherein each of said cables is connected to one of its anchor points via a spring.

10. The apparatus of claim 8 wherein said mechanical system for moving said moveable housing back and forth comprises; a worm gear driven by said translation motor, said motor having its drive shaft disposed parallel to the direction of said back and forth movement of said moveable housing, a pair of spur gears mounted for rotation on the inside of said moveable housing and on opposite sides of said worm gear, both of said spur gears being driven by said worm, each of said spur gears having rubber-rimmed wheels integrally attached thereto, said wheels being of greater diameter than said spur gears, said wheels projecting through windows on opposite sides of said moveable housing and engaging the inside surface of said stationary housing.

11. The apparatus of claim 8 wherein said mechanical system for moving said moveable housing back and forth comprises, a worm gear driven by said translation motor, said motor having its drive shaft disposed parallel to the direction of said back and forth motion, a pair of spur gears mounted for rotation on opposite sides of said worm gear and driven thereby, each of said spur gears projecting through a window on opposite sides of said moveable housing, a pair of racks attached to the inside of said stationary housing, each of said racks being arranged to mesh with a different one of said spur gears.

12. The apparatus of claim 8 wherein said mechanical system for moving said moveable housing back and forth comprises, a spur gear attached to the drive shaft of said translation motor, said motor having its drive shaft disposed parallel to the back and forth motion of said moveable housing, said spur gear being located on the outside of said moveable housing on the end thereof opposite from said rotating mirror, said spur gear meshing with a pinion gear which in turn is threaded onto a stationary lead screw anchored to the inside of said stationary frame, and means connected to said spur and pinion gears to keep them in mesh, thereby providing the desired traction for said moveable housing.

* * * * *